United States Patent [19]
Claytor

[11] Patent Number: 5,263,862
[45] Date of Patent: Nov. 23, 1993

[54] METHOD OF MAKING A NEEDLEWORK GRAPH

[76] Inventor: Nancy A. Claytor, 217 E. Liberty St., York, S.C. 29745

[21] Appl. No.: 929,914

[22] Filed: Aug. 17, 1992

[51] Int. Cl.⁵ .............................................. G09B 19/20
[52] U.S. Cl. ...................................... 434/95; 434/88; 434/90
[58] Field of Search ...................... 434/83, 88, 90, 95

[56] References Cited

U.S. PATENT DOCUMENTS

| | | | |
|---|---|---|---|
| 464,359 | 12/1891 | Hagan | 434/90 X |
| 1,560,283 | 11/1925 | Mehlem | 434/95 X |
| 4,259,784 | 4/1981 | MacPherson | 434/95 X |
| 4,404,750 | 9/1983 | Marx et al. | 424/95 X |
| 4,799,680 | 6/1989 | Weimar | 434/88 X |
| 4,836,783 | 6/1989 | Harper | 434/95 X |

Primary Examiner—Gene Mancene
Assistant Examiner—L. Thomas
Attorney, Agent, or Firm—Clifton Ted Hunt

[57] ABSTRACT

This invention provides a graphing system that enables an average person interested in reproducing a colored design by needlework, for which there is no existing graph, to quickly and easily graph the colored design for reproduction by such needlework as cross stitch, needlepoint, quilting, smocking, duplicate stitch, or knitting.

4 Claims, 8 Drawing Sheets

METHOD OF MAKING A NEEDLEWORK GRAPH

FIELD OF THE INVENTION

This invention relates to the method of making a needlework graph and more specifically to the method of graphing by the average person, who is not skilled in the art of graphing, of a specific colored design desired to be reproduced by needlework on canvas or fabric.

BACKGROUND OF THE INVENTION

It is known to provide needlework graphs to be used for the needlework reproduction on canvas or fabric of the design shown on the graph.

The closest known prior art graphs comprise sheets of smooth-surfaced transparent plastic printed with intersecting lines and arranged to define spaces that are either square, rectangular, or another shape, depending on the type of needlework to be used in reproducing the selected design. The spaces in the graph correspond to the stitches in the canvas or fabric on which the design will be reproduced. The design is formed on the graph by coloring the spaces in the graph with appropriate colors to form the intended design, and the design is reproduced on canvas, for example, by locating stitches in the canvas that correspond to the overlying spaces in the graph and crossing those stitches with yarn of the same color as the corresponding spaces in the graph.

The said graph of the prior art is completed by a user placing a selected printed sheet of the smooth-surfaced transparent plastic over a specific colored design and coloring the spaces overlying each color in the selected design with correspondingly colored felt-tipped markers of the type commonly known as MAGIC MARKER felt tip pens.

Difficulty has been experienced in matching the colors on the selected design with colors of so-called MAGIC MARKER felt tip pens because of the wide discrepancy between the infinite variety of colors on designs to be selected and the limited number of colors available when selecting MAGIC MARKER felt tip pens. Other objections to the use of MAGIC MARKER felt tip pens to complete the said prior art graphs are that the liquid-based MAGIC MARKER felt tip pens sometimes smear in use; and the MAGIC MARKER felt tip pens dry out and become unusable after a period of time.

The users of the prior art printed sheets of smooth-surfaced transparent plastic are limited to the use of MAGIC MARKER felt tip pens for coloring the spaces on said smooth-surfaced sheets because neither colored pencils or anything else will stick to the smooth-surfaced plastic sheets.

SUMMARY OF THE INVENTION

It is a primary object of this invention to provide a method of making a graph for needlework that enables an average person interested in reproducing a specific colored design by needlework, for which there is no existing graph, to quickly and easily graph the colored design for reproduction by such needlework as cross stitch, needlepoint, quilting, smocking, duplicate stitch, or knitting.

According to this invention, a plurality of intersecting lines are printed, without a design, on a transparent plastic sheet, having a matte finish on one surface, with different sizes of squares, rectangles, etc. that give a spread of sizes to form transparent foundations for the finished graphs. The type of plastic on which the patterns of intersecting lines are printed is preferably sheets of plastic known in the engineering trade as TELEDYNE POST Style #18×4 drafting film.

In use, the person desiring to make a needlework graph of a colored design first selects a transparent foundation appropriately printed as described above for the definition of detail to be used in reproducing the design. The appropriate transparent foundation is placed over the colored design to be reproduced, and colored pencils are then used to copy the underlying design onto the overlying spaces on the superposed transparent foundation. That completes the graph and the graph is then used in the conventional manner to reproduce the design by needlework on canvas or fabric.

DETAILED DESCRIPTION OF THE INVENTION

Referring more specifically to the drawings, the numeral 10 broadly designates a sheet of prior art tracing film known in the engineering trade as TELEDYNE POST Style #18×4 drafting film. It is a coated, matte polyester product.

The film base is a crystalized, aligned polyester (polyethylene terphthalate) film. The crystallization and alignment enhances the dimensional stability over ordinary film products, such as packaging films.

Figure 1:
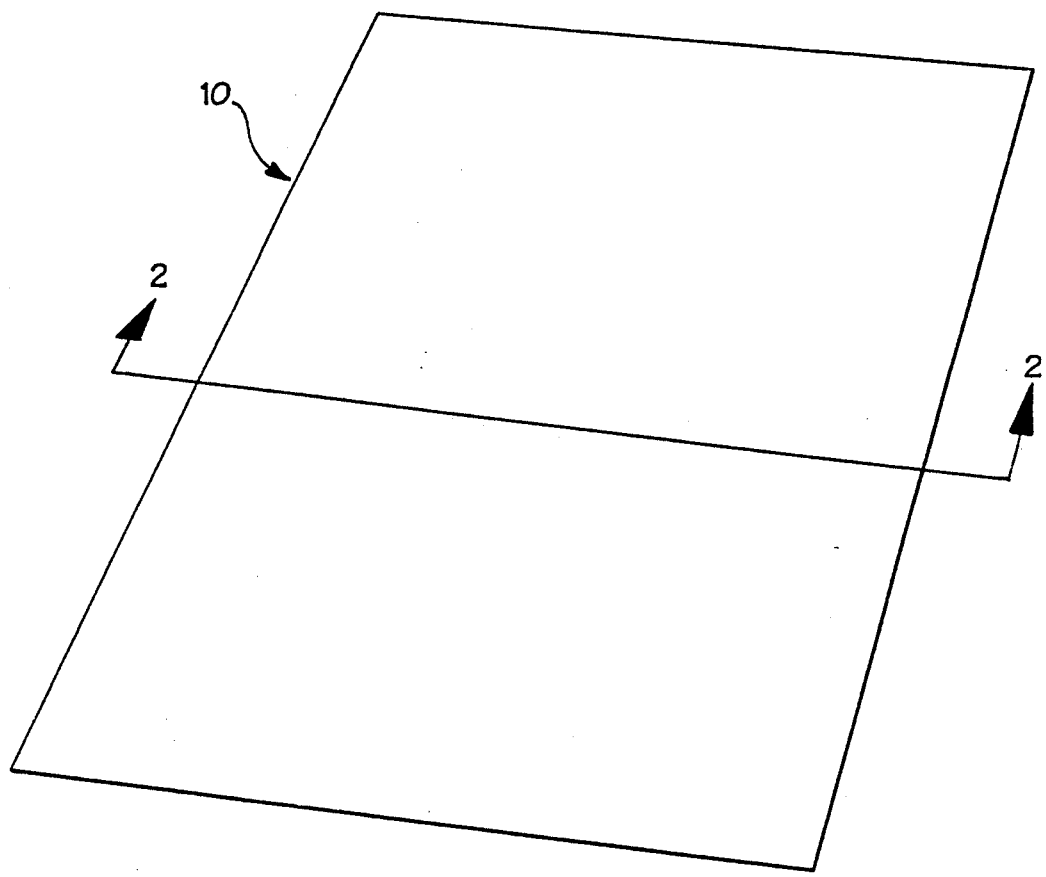
FIG. 1 is a perspective view of a sheet of prior art TELEDYNE POST Style #18×4 drafting film.
Figure 2:
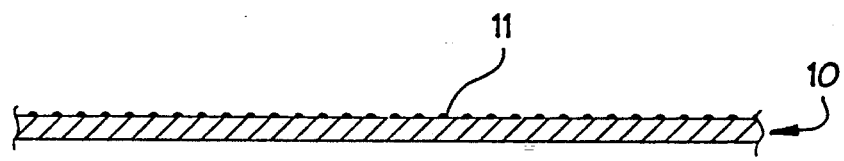
FIG. 2 is a greatly enlarged sectional view taken substantially along the line 2—2 in FIG. 1, showing the matte finish on one surface of the prior art drafting film.

The coating on the film is comprised of silica (silicon dioxide) dispersed in an acrylic (polymethyl methacrylate) resin. The silica provides a matte surface for drafting, plotting, coating, coloring, etc. The acrylic resin binder is hard, and one of the more light stable, discoloration resistant materials available. The matte surface on the film 10 is indicated at 11 in FIG. 2.

Figure 3:
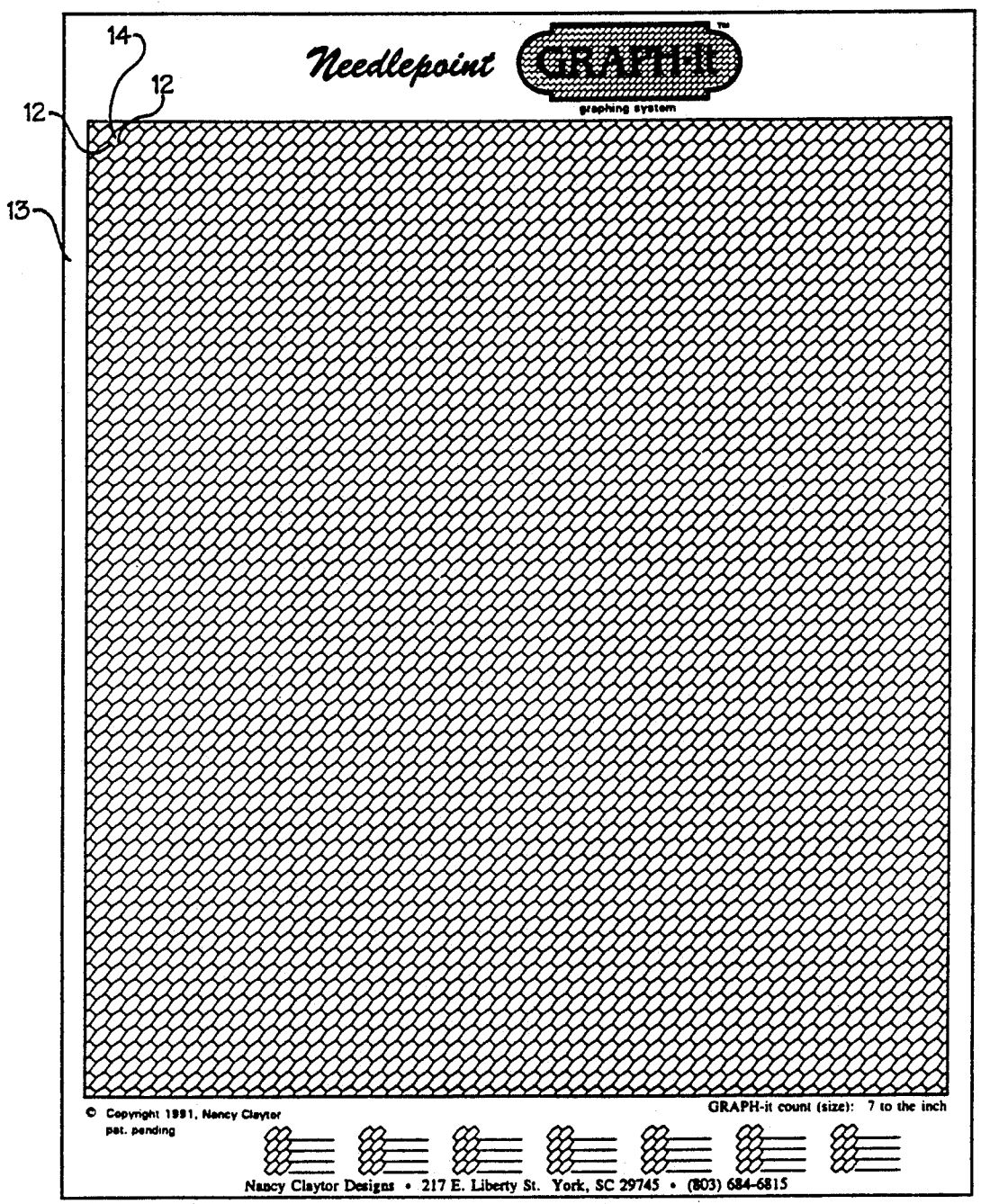
FIGS. 3, 4, and 5 are top plan views of the prior art drafting film shown in FIGS. 1 and 2, after being printed to form a transparent foundation for a needlepoint graph, a duplicate stitch graph, and a cross stitch graph, respectively.
Figure 4:
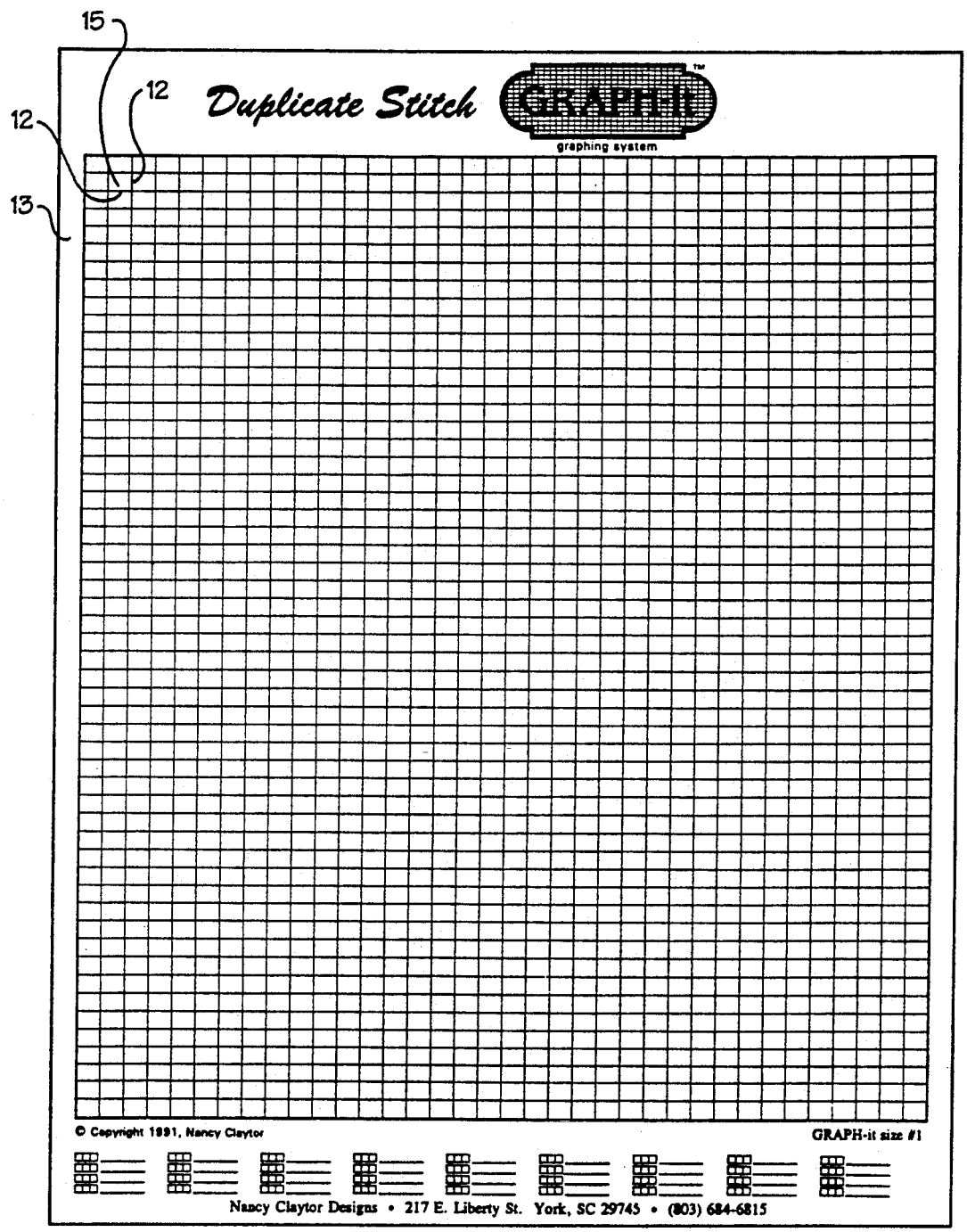
Figure 5:
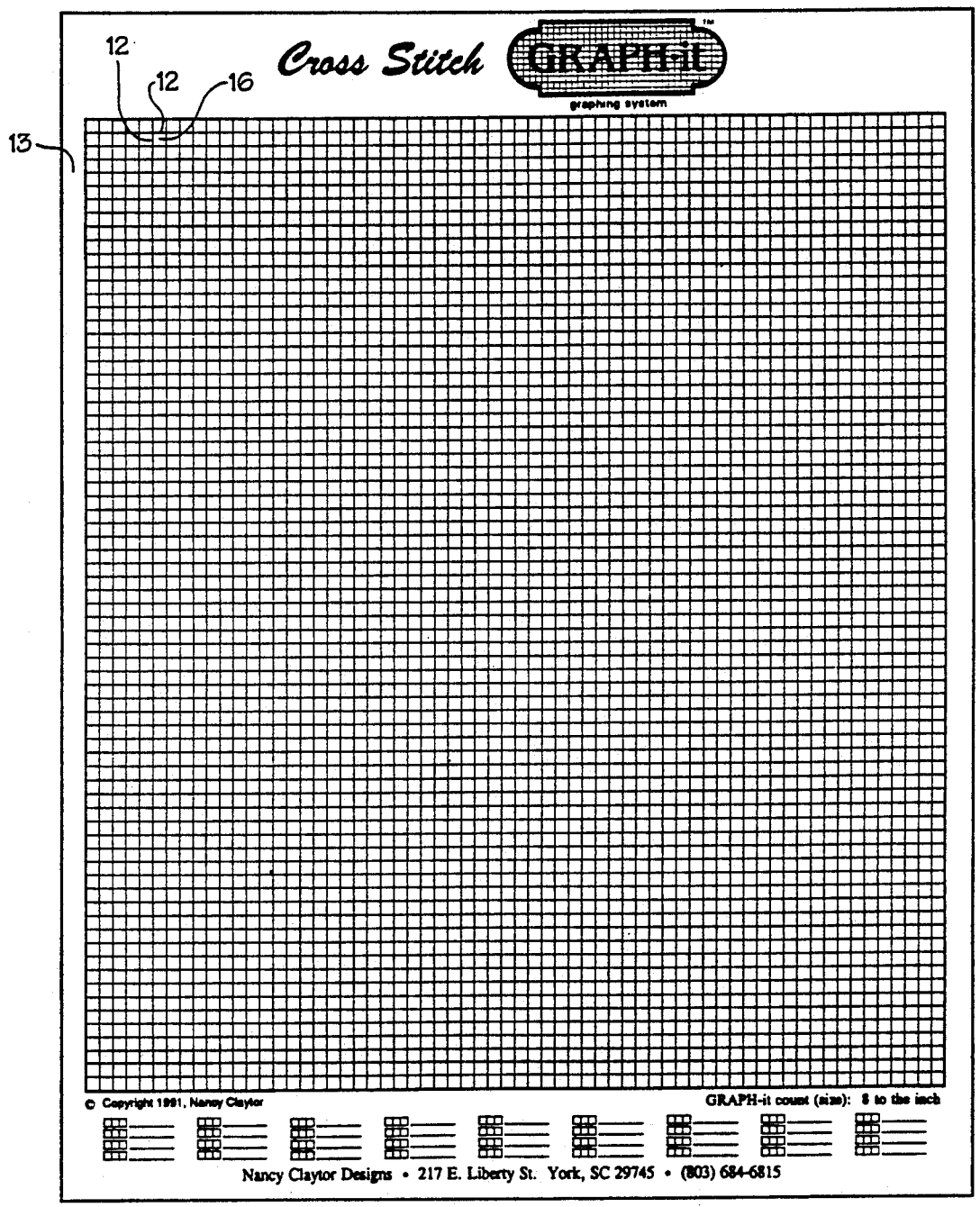

According to the invention, the prior art tracing film 10 is printed with a plurality of intersecting lines 12 to form a transparent foundation 13 for making a needlework graph (FIGS. 3, 4, and 5). In FIG. 3, the intersecting lines 12 form diagonally extending rows of ellipses 14 for making a needlepoint graph; in FIG. 4, the intersecting lines 12 form rectangles 15 for making a duplicate stitch graph; and in FIG. 5, the intersecting lines 12 form squares 16 for making a cross stitch graph.

The sheets of film 10 are preferably cut to a desired size, such as 8.5×11 inches. The transparent foundations 13 are printed in different sizes for the convenience of the user in making graphs for needlework having the desired definition of detail.

Figure 6:
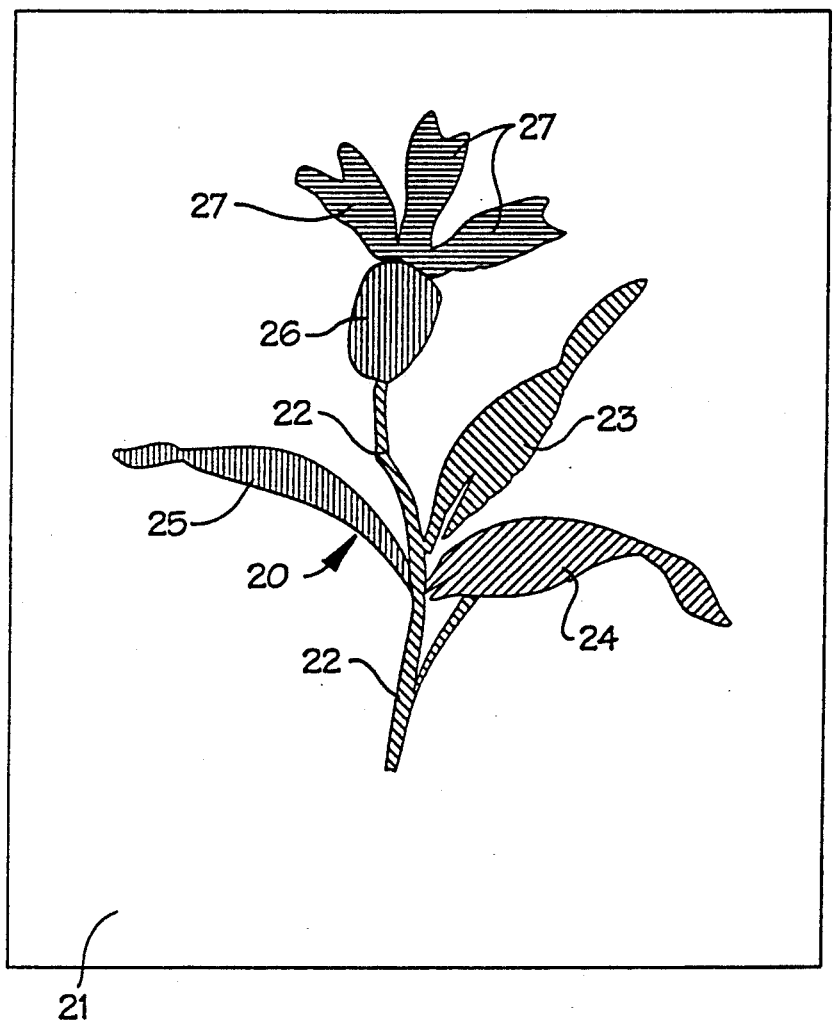
FIG. 6 is a plan view of a colored design to be reproduced by needlework, the hatching illustrating different colors in the specific design.

FIG. 6 shows an example of a specific colored design to be reproduced by needlework. It is a floral design, broadly indicated at 20, on wallpaper 21. The floral design 20 is hatched to indicate the colors in the design. The stem 22 and the leaf 23 are green; the leaf 24 is brown; the leaf 25 and the bud 26 are red; and the foliage 27 is blue.

Figure 7:
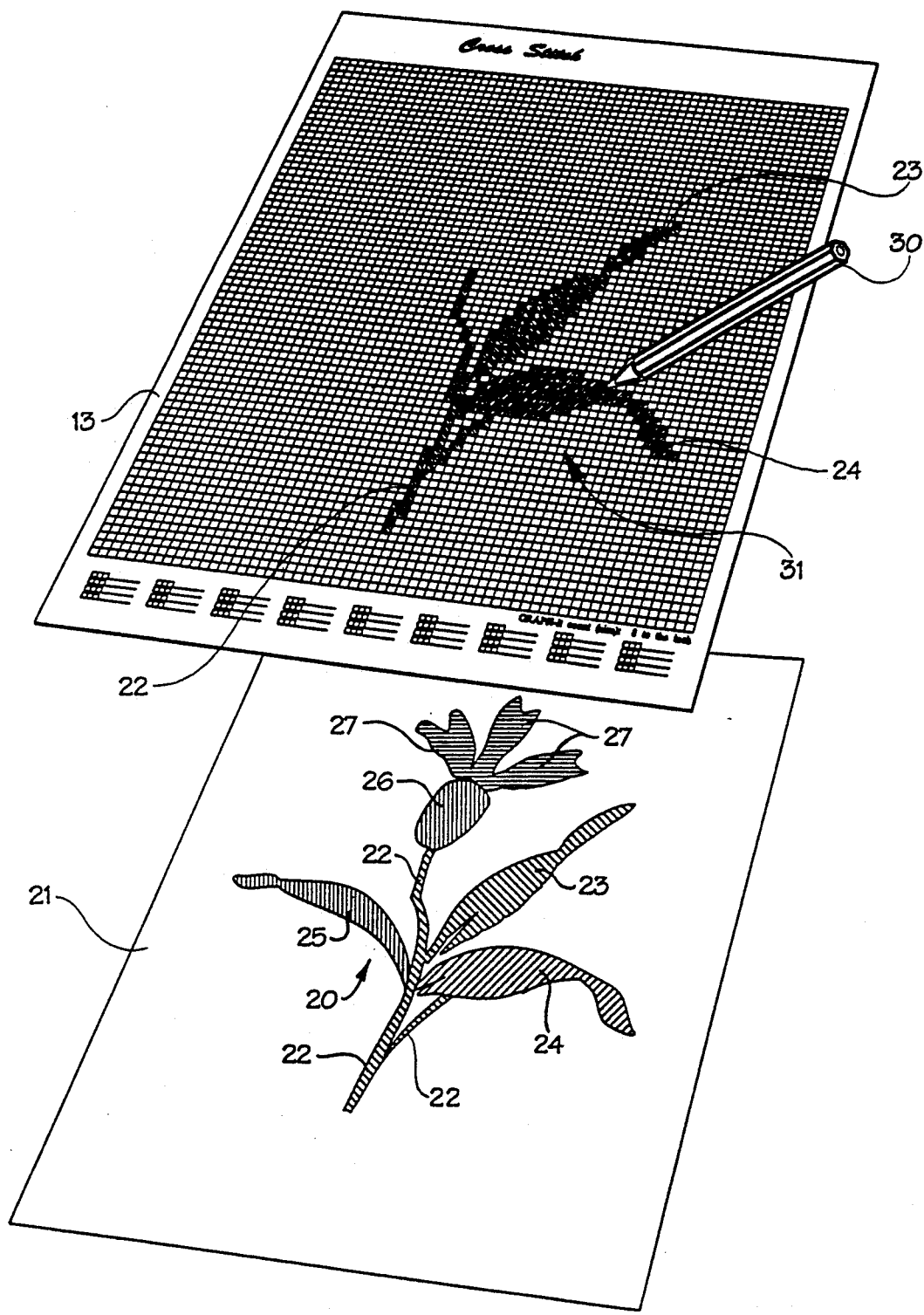
FIG. 7 is an exploded perspective view of the transparent foundation shown in FIG. 5 superposed over the colored design shown in FIG. 6, and illustrating the completion of the graph by the tracing with colored pencils of colors on the transparent foundation corresponding to the subjacent colors in the design of FIG. 6.

FIG. 7 shows the transparent foundation 13 of FIG. 5 positioned in superposed relation to the design 20 to graph the design by using water color pens, chemical colored pens, or colored pencils 30 to copy the colors in the design onto the matte surface 11 of the foundation 13. The use of colored pencils to copy the colors in the design on the matte surface 11 of the foundation 13 is preferable because colored pencils are readily available in at least one hundred and twenty (120) different colors and shades of color, making it relatively easy to match the colors in the design. Another advantage of using colored pencils is that it is easier to erase and wash off the marks made by colored pencils than the marks made by other types of markers.

A brown colored pencil 30 is shown being used to color those spaces on the transparent foundation that overlie the brown leaf 24. A green colored pencil has already been used to color the spaces in the transparent foundation that cover the stem 22 and leaf 23. The graph of the colored design 20 will be completed by using a red colored pencil to color the spaces overlying the leaf 25 and bud 26, and a blue colored pencil to color those squares in the transparent foundation 13 that overlie the foliage 27.

Figure 8:
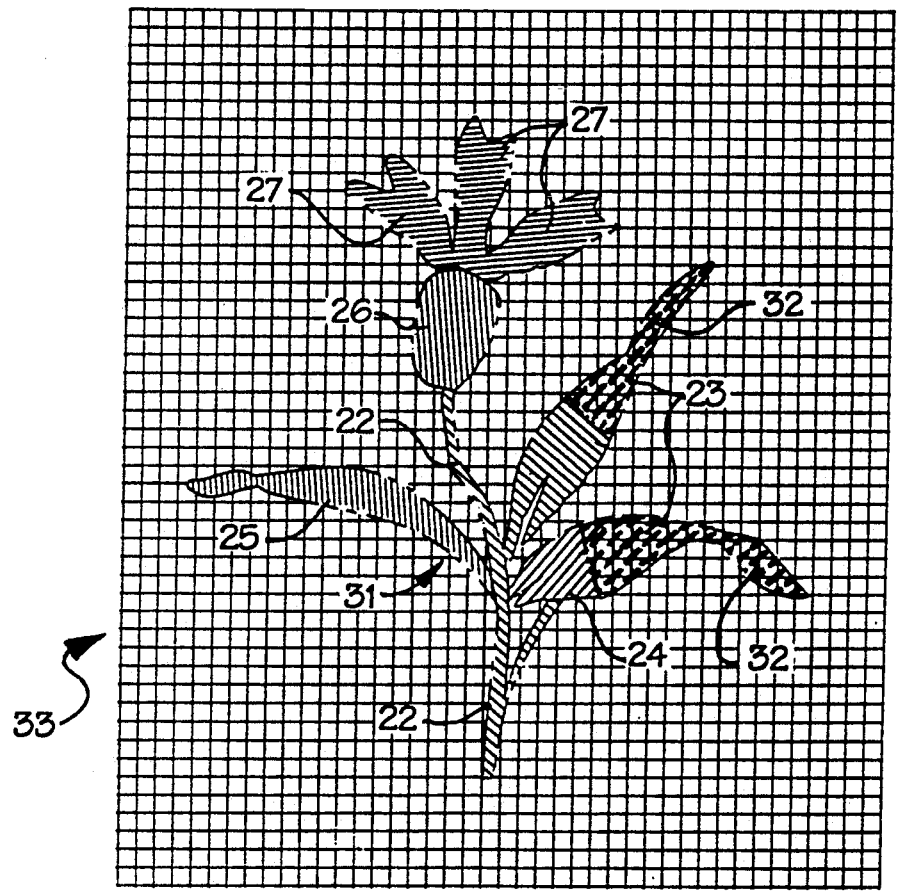
FIG. 8 is a plan view of a reproduction by cross stitch of the design of FIG. 6.

The graphed design 31 will be used in the conventional manner to reproduce the design 20 by cross stitch 32 on canvas 33, as shown on the leaves 23 and 24 in FIG. 8.

There is thus provided a novel method for an average person who is not skilled in graphing to graph a colored design for reproduction by needlework.

Although specific terms have been employed in describing the invention, they have been used in a generic and descriptive sense only and not for the purpose of limitation.

I claim:

1. A method of graphing a colored design for reproduction of the design on canvas or fabric by needlework, said method comprising the steps of:
   (a) providing a sheet of transparent plastic having a matte finish on one surface,
   (b) printing a pattern of intersecting lines defining spaces on the sheet of transparent plastic to form a transparent foundation for a needlework graph,
   (c) providing a colored design to be reproduced on canvas or fabric by needlework,
   (d) positioning the transparent foundation in superposed relation to the colored design, and
   (e) completing the graph by using correspondingly colored markers to copy the colors of the design in the spaces on the matte surface of the transparent foundation that overlie the design.

2. The method of claim 1 wherein the transparent plastic having a matte finish on one surface is tracing film.

3. The method of claim 1 wherein the colored markers are colored pencils.

4. The method of claim 1 wherein a plurality of sheets of transparent plastic having a matte finish on one surface are printed with different sizes of patterns of intersecting lines defining spaces on the sheet of transparent plastic to form different sizes of graphs depending on the desired definition of detail to be used in reproducing the design.

* * * * *